(12) United States Patent
Bakoledis

(10) Patent No.: US 6,575,457 B2
(45) Date of Patent: Jun. 10, 2003

(54) VARIABLE LENGTH SHEET FEEDING MECHANISM

(75) Inventor: Andrew Bakoledis, Chester, CT (US)

(73) Assignee: GBR Systems Corporation, Chester, CT (US)

( * ) Notice: Subject to any disclaimer, the term of this patent is extended or adjusted under 35 U.S.C. 154(b) by 0 days.

(21) Appl. No.: 09/967,765

(22) Filed: Oct. 1, 2001

(65) Prior Publication Data

US 2003/0011125 A1 Jan. 16, 2003

Related U.S. Application Data

(63) Continuation-in-part of application No. 09/902,996, filed on Jan. 12, 2001.

(51) Int. Cl.[7] .............................................. B65H 31/20
(52) U.S. Cl. ..................................... 271/223; 271/3.14
(58) Field of Search ............................... 271/223, 3.14, 271/207, 220, 264, 267, 84, 312, 314; 414/790.3, 900

(56) References Cited

U.S. PATENT DOCUMENTS

| 721,571 | A | 2/1903 | Kramer |
|---|---|---|---|
| 1,572,582 | A | 2/1926 | Tytus |
| 2,166,447 | A | 7/1939 | Ruppenthal |
| 2,477,830 | A | 8/1949 | Sandberg |
| 3,142,374 | A | 7/1964 | Carter |
| 3,216,552 | A | 11/1965 | Lister |
| 3,238,826 | A | 3/1966 | Crispe |
| 3,556,511 | A | 1/1971 | Henrietta |
| 3,935,941 | A | 2/1976 | Keck |
| 4,056,202 | A | 11/1977 | Mackenzie |
| 4,998,910 | A | * 3/1991 | Mohaupt et al. ............... 493/12 |
| 5,074,402 | A | 12/1991 | Bender-Zanoni |
| 5,086,855 | A | 2/1992 | Tolson |
| 5,277,297 | A | 1/1994 | Tolson |
| 5,280,902 | A | 1/1994 | Helmstadter |
| 5,755,308 | A | 5/1998 | Lindstrom |
| 6,032,953 | A1 | * 3/2001 | Otto et al. ................... 271/176 |

* cited by examiner

Primary Examiner—Dean J. Kramer
Assistant Examiner—Michael Lowe
(74) Attorney, Agent, or Firm—Joseph J. Previto

(57) ABSTRACT

A sheet feeding mechanism having a frame support assembly and an accumulating area mounted on the frame support assembly. The accumulating area has a feeding mechanism and a release mechanism. The feeding mechanism adapted to feed sheets into the accumulating area to accumulate a stack of sheets. A mechanism for moving a stack of sheets out of the accumulating area past the release mechanism. A mechanism for changing the length of the accumulating area to permit the accumulating area to receive sheets of different lengths.

20 Claims, 8 Drawing Sheets

VARIABLE LENGTH SHEET FEEDING MECHANISM

RELATED APPLICATION

This application is a continuation in part of U.S. patent application Ser. No. 09/902,996 pending filed Jan. 12, 2001.

BACKGROUND

The present invention relates to sheet feeding mechanisms and more particularly to an improved sheet feeding mechanism which can feed paper sheets of various lengths.

In current sheet feeding mechanisms, sheets of paper are moved from one machine to another or from one portion of a machine to another. Various means are provided for feeding the paper sheets including rollers, belts, etc. However, some machines are not easily adapted to feed sheets of different lengths. When a different length sheet is to be fed by a machine, the machine must usually be shut down and complicated adjustments must be made to accommodate the different length sheet. This is time consuming and increases the down time that a machine is not being used.

Objects

The present invention overcomes these difficulties and has for one of its objects the provision of an improved sheet feeding mechanism which can be easily and quickly converted to feed sheets of different lengths.

Another object of the present invention is the provision of an improved sheet feeding mechanism which can be easily converted to feed sheets of short, intermediate or long lengths with little down time.

Another object of the present invention is the provision of an improved sheet feeding mechanism which is simple to operate.

Another object of the present invention is the provision of an improved sheet feeding mechanism which is inexpensive to manufacture and to maintain.

Other and further objects of the invention will be obvious upon an understanding of the illustrative embodiment about to be described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein.

Figure 8:
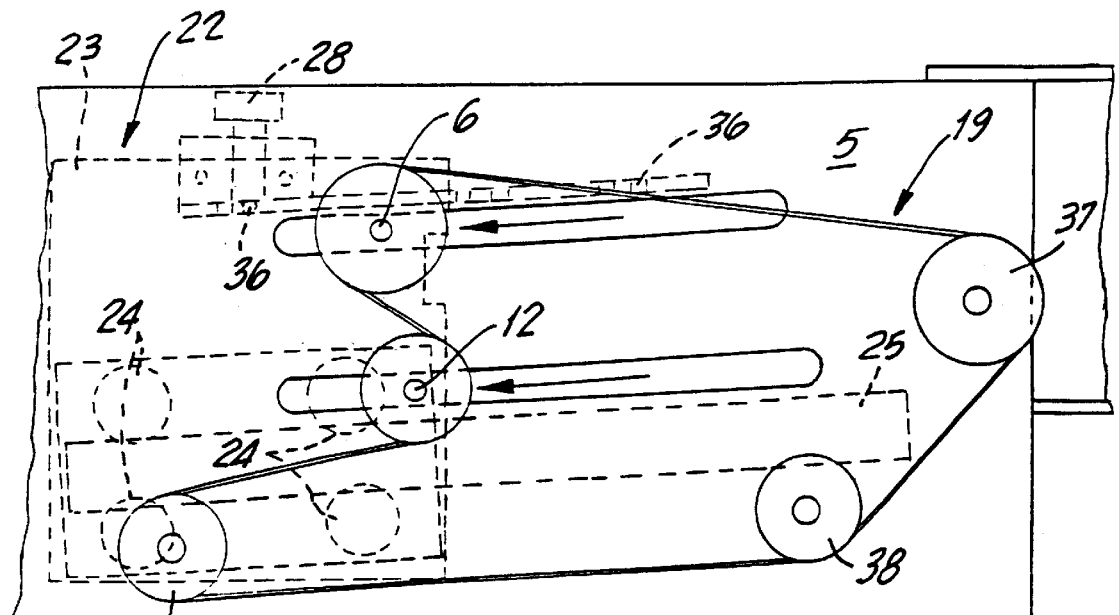

FIG. 8. is a side elevational view showing the positions of the drive system when feeding the shortest sheets.

Figure 1:
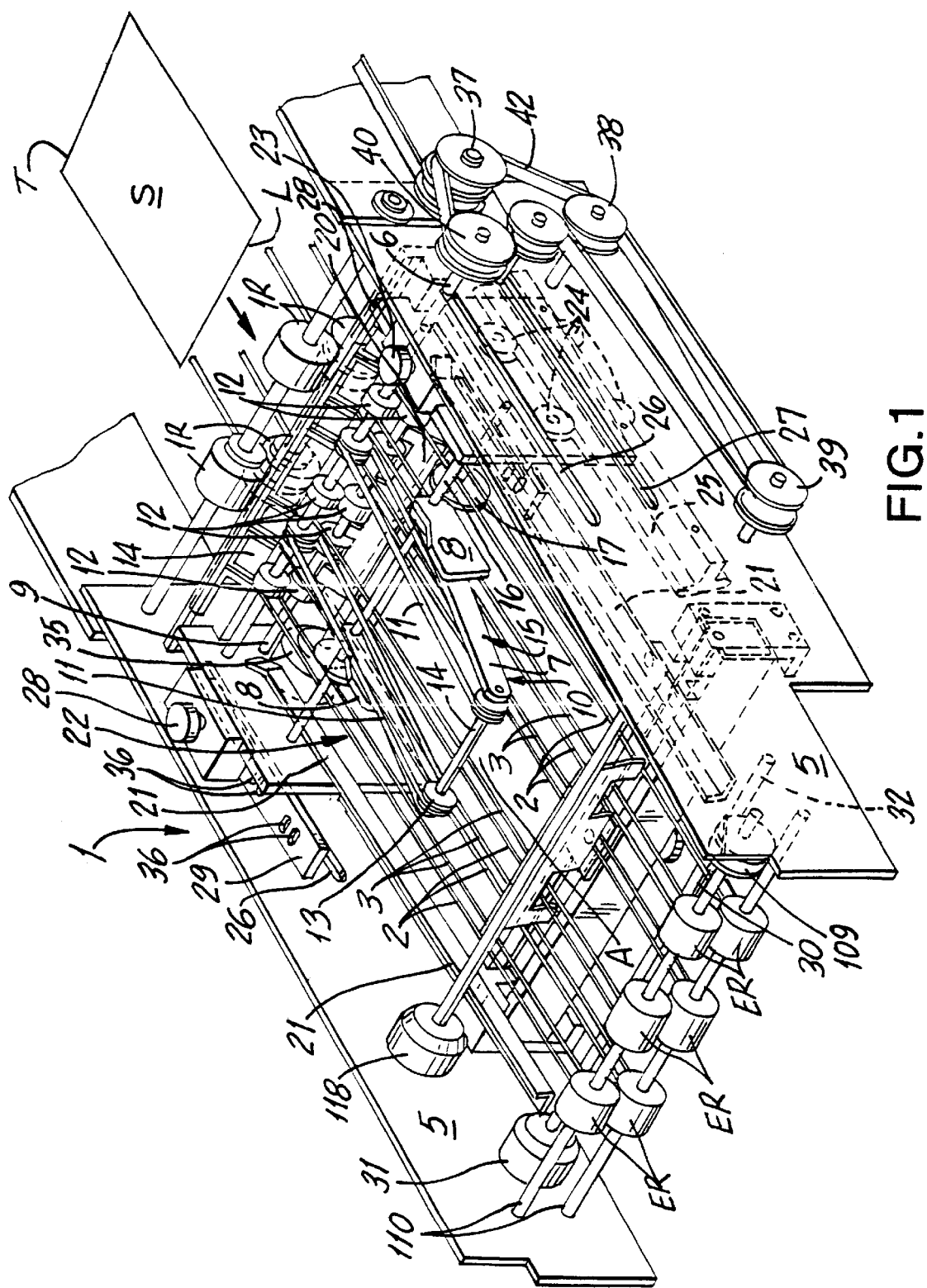
FIG. 1 is a perspective view of a machine in which the present invention is used.
Figure 2:
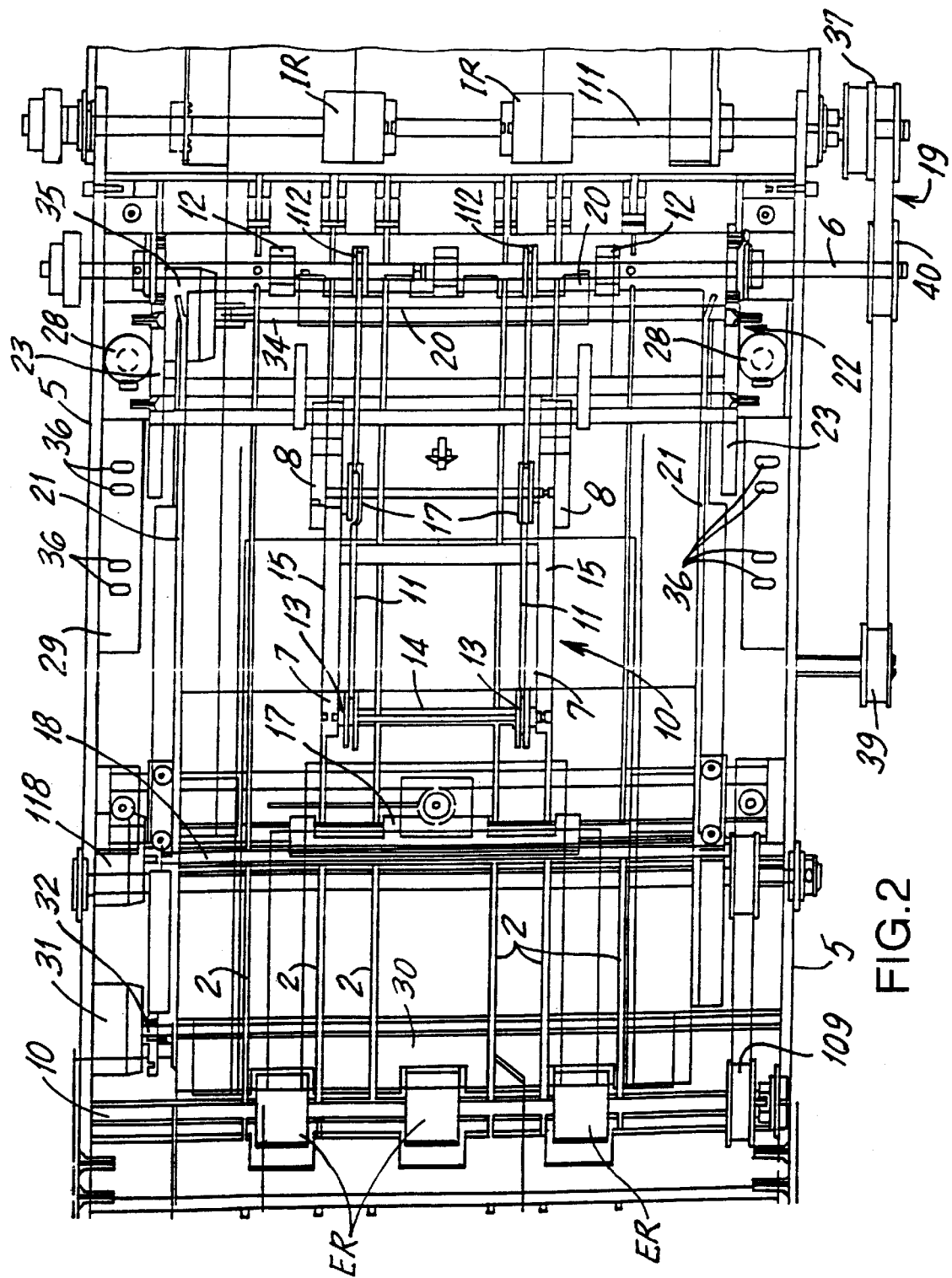
FIG. 2 is a top view thereof.
Figure 3:
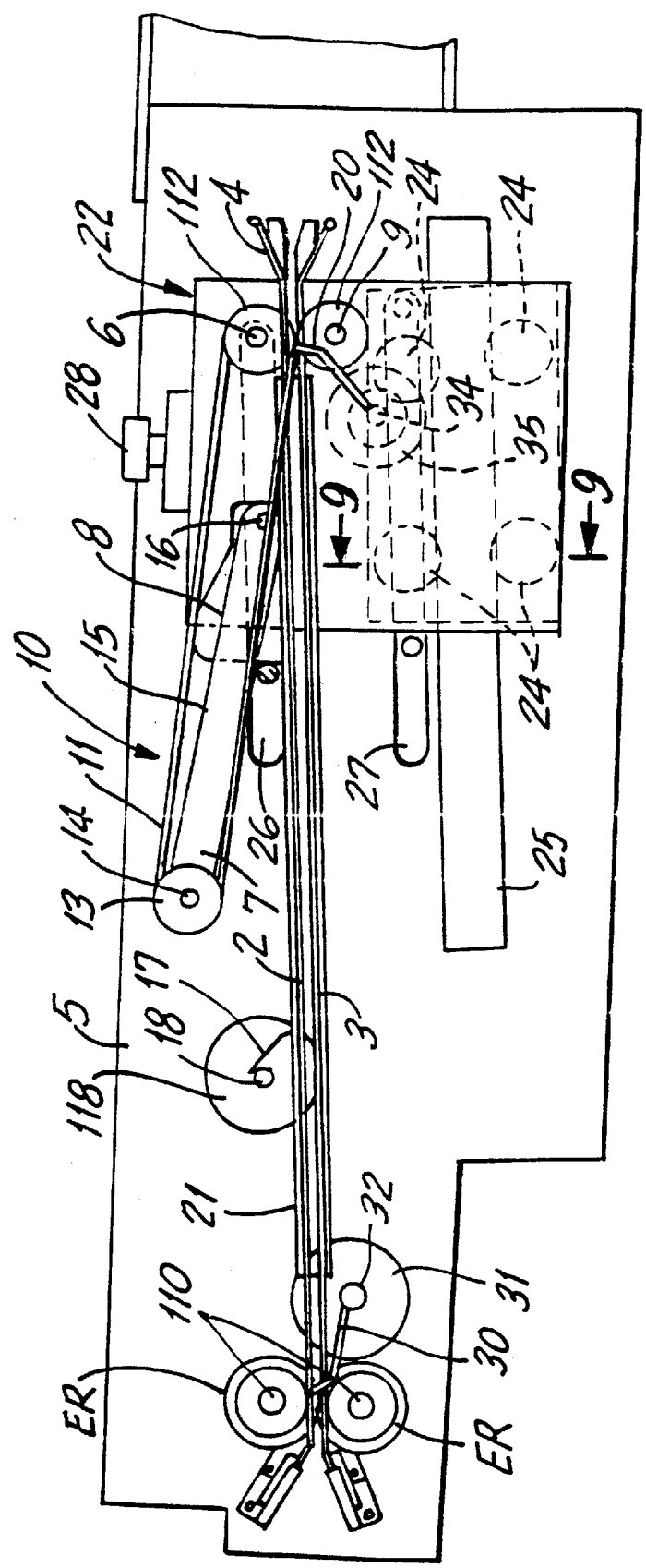
FIG. 3 is a schematic side elevational view showing the position of some parts when feeding sheets of the longest lengths.
Figure 9:
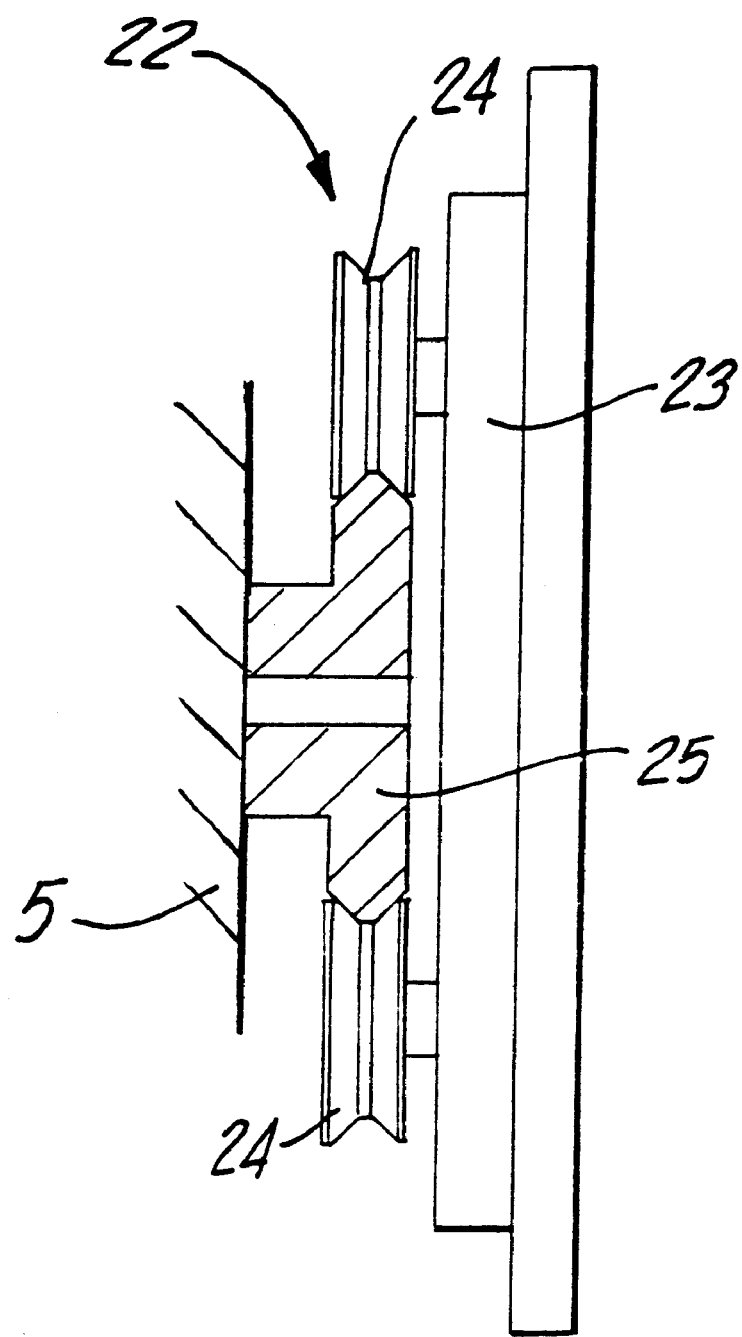

FIG. 9 is a sectional view along line 9—9 of FIG. 3.

DESCRIPTION

Referring to the drawings, sheets of paper S are fed from a source (not shown) and are moved into the mechanism 1 by a plurality of rotatable insert rollers IR mounted on power shafts 111 driven by power pulley 37 and then moved out of the mechanism by exit rollers ER which are driven by power pulley 109. The mechanism 1 includes an accumulating area A which comprises a plurality of superimposed pairs of stationary cables 2–3, opposed side rails 21, opposed frame supports 5, a rear main document kicker 20 and a front release gate 30. In general, the sheets S are fed by insert rollers IR through a mouth 4 and move between the plurality of superimposed pairs of stationary cables 2 and 3 and the pair of opposed side rails 21. A plurality of main first and second feed rollers 12 and 112, respectively, are mounted in front of mouth 4 and adjacent to the main document kicker 20. The feed rollers 12 and 112 grasp the leading edge L of each sheet S as it passes through the mouth 4 and move it forward until the sheet is deposited in the accumulating area A. When positioned in the accumulating area A the leading edge L of each sheet S is in back of the front release gate 30, which acts as a stop for the sheets K and the trailing edge T is in front of the main document kicker 20. When a sufficient number of sheets have accumulated in a stack in the accumulating area A, a control mechanism (not shown) activates the movement of front release gate 30 and main document kicker 20. The front release gate 30 is moved out of the way and the main document kicker 20 is swung forward to push the stack of sheets S out of the accumulating area A. The movement of the front release gate 30 and the main document kicker 20 are synchronized and coordinated so that the main document kicker 20 is moved toward the front release gate 30, it is moved out of the path of a stack to permit a stack to move out of the accumulating area. The exit rollers ER will grasp the leading edges L of the stack of sheets S and pull the stack out of the accumulating area A as a unit.

The front release gate 30 is mounted on a transverse shaft 32 which is reciprocated back and forth by a motor 31 so that the front release gate 30 is moved from a raised position in the path of the stack of sheets S in the accumulating area A to a lowered position out of the path of the stack of sheets S to permit the stack of sheets to move forward out of the accumulating area A after which the front release gate 30 is moved back to its raised position. The main document kicker 20 is mounted on a transverse shaft 34 controlled by a motor 35 which reciprocates the main document kicker 20 back and forth between a raised position in back of the stack to a forward position where it will strike the trailing edge T of the stack of sheets S in the accumulating area A and push the stack of sheets S forward toward and through the exit rollers ER after which the main document kicker 20 will be swung back to its original raised position. Movement of the release gate 30 and the main kicker 20 are synchronized and coordinated by a controller (not shown) so that when the main document kicker 20 is moved forward to push the stack of sheets S out of the accumulating area A, the release gate 30 is swung down and out of the way to permit the stack of sheets S to pass through.

A trolley assembly 22 is provided which is moveable back and forth relative to the frame supports 5 to permit the mechanism to process sheets of different lengths. The trolley assembly 22 comprises a pair of opposed support plates 23 having a plurality of spaced pairs of superimposed support rollers 24 extending therefrom, main document kicker 20 mounted on shaft 34 controlled by motor 35, feed rollers 12 and 112 mounted on shafts 6 and 9, respectively, and an auxiliary transfer conveyor assembly 10 which will be described in greater detail hereinafter. The support rollers 24 of the trolley assembly 22 are mounted on and move along an elongated rail 25 which is mounted on each of the frame support 5. The frame supports 5 have spaced elongated slots 26 and 27 to receive the shafts 6 and 9 of feed rollers 12 and 112 which extend therethrough. The movement of the trolley assembly 22 from a rearward position (FIG. 3) where the longest sheets S are processed through an intermediate position (FIG. 4) where intermediate length sheets are processed to a forward position (FIG. 5) where the shortest sheets are processed will change the size of the accumulating area A from its greatest length (FIG. 3) through an intermediate length (FIG. 4) to its shortest length (FIG. 5). The support plates 23 have spring pressed lock pegs 28 mounted thereon and movable therewith. Each frame support 5 has a lock bar 29 mounted thereon having a plurality of spaced lock openings 36 adapted to receive the lock pegs 28 and hold the trolley assembly 22 in one of its many positions. When the trolley assembly 22 is to be moved from one position to another, the lock pegs 28 are raised and moved out of the lock opening 36 and after the trolley assembly reaches a new position, the lock pegs 28 are inserted into another opening 36 in order to hold the trolley assembly 22 in the desired new position.

The auxiliary conveyor assembly 10 which is adapted to move the shortest sheets (as will be more fully described hereinbelow) comprises a plurality of spaced movable belts 11 driven by and wound around the main second feed rollers 112 (two shown in drawings) and front auxiliary feed rollers 13 which are mounted on shaft 14 supported by spaced support arms 15. The shaft 14 is mounted on the forward ends 7 of the spaced support arms 15 and the rear ends 8 of support arms 15 are pivotally mounted on a pivot shaft 16. The front auxiliary feed rollers 13 and belts 11 are adapted to be lowered or raised around pivot shaft 16. When lowered, belts 11 may ride on a pair of idler rollers 171.

In conjunction with the activation of the auxiliary conveyor assembly 10 to process the shortest sheets, an auxiliary document kicker 17 is provided and is mounted on reciprocatable transverse shaft 18 which is controlled by motor 118. The auxiliary document kicker 17 is mounted above the level of the accumulating area A, in front of the slots 26–27, spaced rearwardly from exit rollers ER and at the rear of the accumulating area A when it is at is shortest length. The auxiliary document kicker 17 is reciprocated back and forth by shaft 18 from a raised position above the accumulating area A to a lowered position at the rear of the shortened accumulating area A to push a stack of short sheets deposited in shortened accumulating area A forward through the exit rollers ER. Its reciprocal movement is also synchronized with reciprocal movement of the front release gate 30 in a manner similar to the synchronization of the main document kicker 20 with the release gate 20.

A power train 19 controls the rotation of the various rollers and comprises the stationary power pulley 37, a pair of spaced stationary idler pulleys 38 and 39, and moveable drive pulleys 40 and 41 movable with the trolley assembly 22. These pulleys 37 to 41 are located outside one of the frame supports 5. Shafts 6 and 9 for feed rollers 12 and 112 extend from drive pulleys 40 and 41 which are mounted on frame plates 5 and extend through slots 26 and 27, respectively, so that they move with the trolley assembly 22. The pulleys 37 to 41 are connected to each other by an endless serpentine belt 42 which is wound around the various pulleys 37–41 and which is driven from the stationary power pulley 37. The power shaft 111 for insert rollers IR extends from stationary power pulley 37. As the trolley assembly 22 moves back and forth between its rearward, intermediate and forward positions, the idler rollers 40–41, shafts 6–9 with feed rollers 12 and 112 will move with the trolley assembly 22 while the other rollers 37–39 remain stationary. Hence, the length of the endless serpentine belt 42 remains the same since those portions of the belt 42 which are shortened by the movement of the trolley assembly 22 in one direction or the other are compensated for by other portions of the belt 42 which are lengthened by the same amount.

When sheets of the longest lengths are to be processed, the trolley assembly 22 is moved to its rearmost position as shown in FIG. 3. The auxiliary conveyor assembly 10 is in its raised position above the accumulating area. The lock pegs 28 are positioned in the rearmost lock opening 36. The insert rollers IR move the sheets S through the mouth 4 and into the accumulating area A where the sheets S lie between the plurality of superimposed cables 2–3, the side rails 21, the front release gate 30 and the rear main document kicker 20. The feed rollers 12 and 112 of the trolley assembly 22 will pick up the leading edges L of the sheets S being fed and will hold the sheets S and move them forward until the sheets S are deposited in the accumulating area A. When a sufficient number of sheets S accumulate in the accumulating area A, the front release gate 30 is swung to its lowered position out of the way of the stack and the rear main document kicker 20 is swung forward to push the stack of sheets out of the accumulating area A and through the exit rollers ER.

Figure 4:
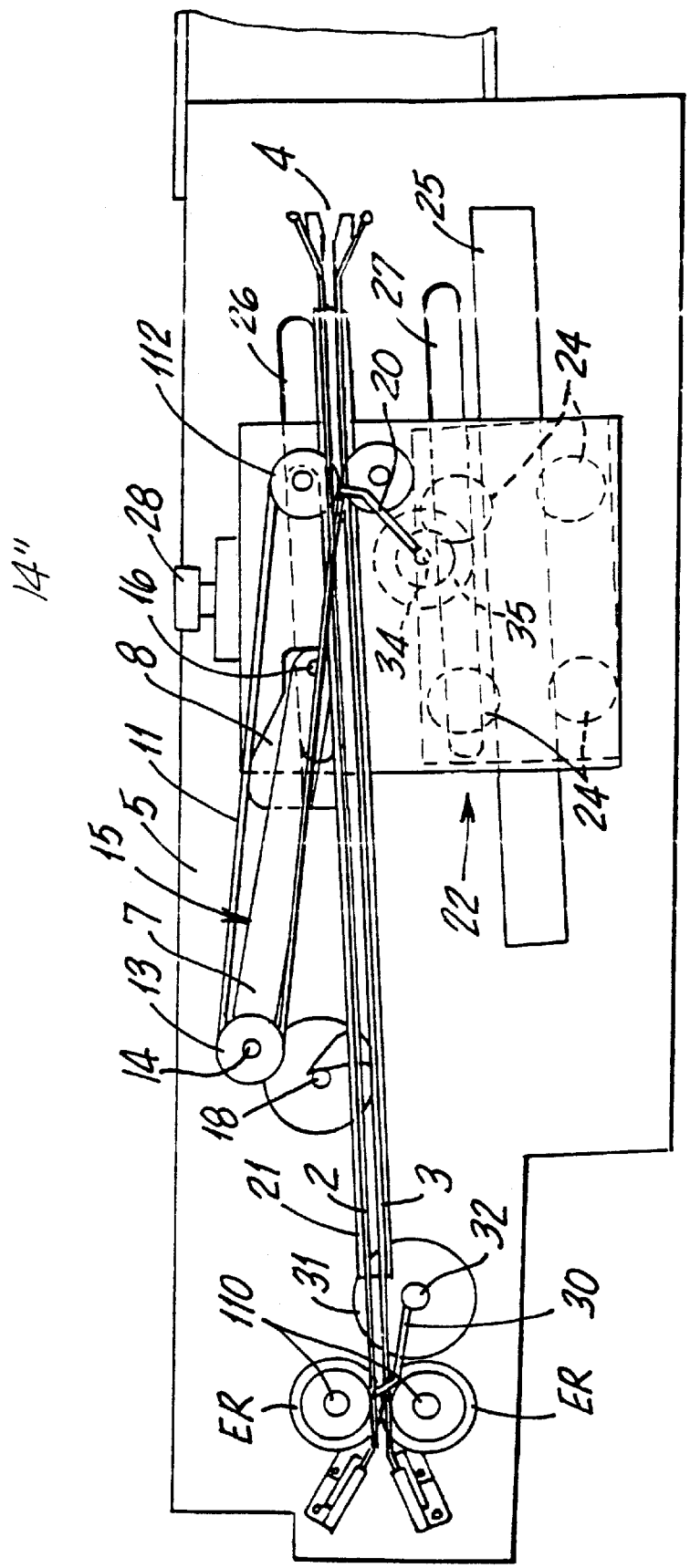
FIG. 4 is a schematic side elevational view showing the position of some parts when feeding sheets of intermediate lengths.
Figure 5:
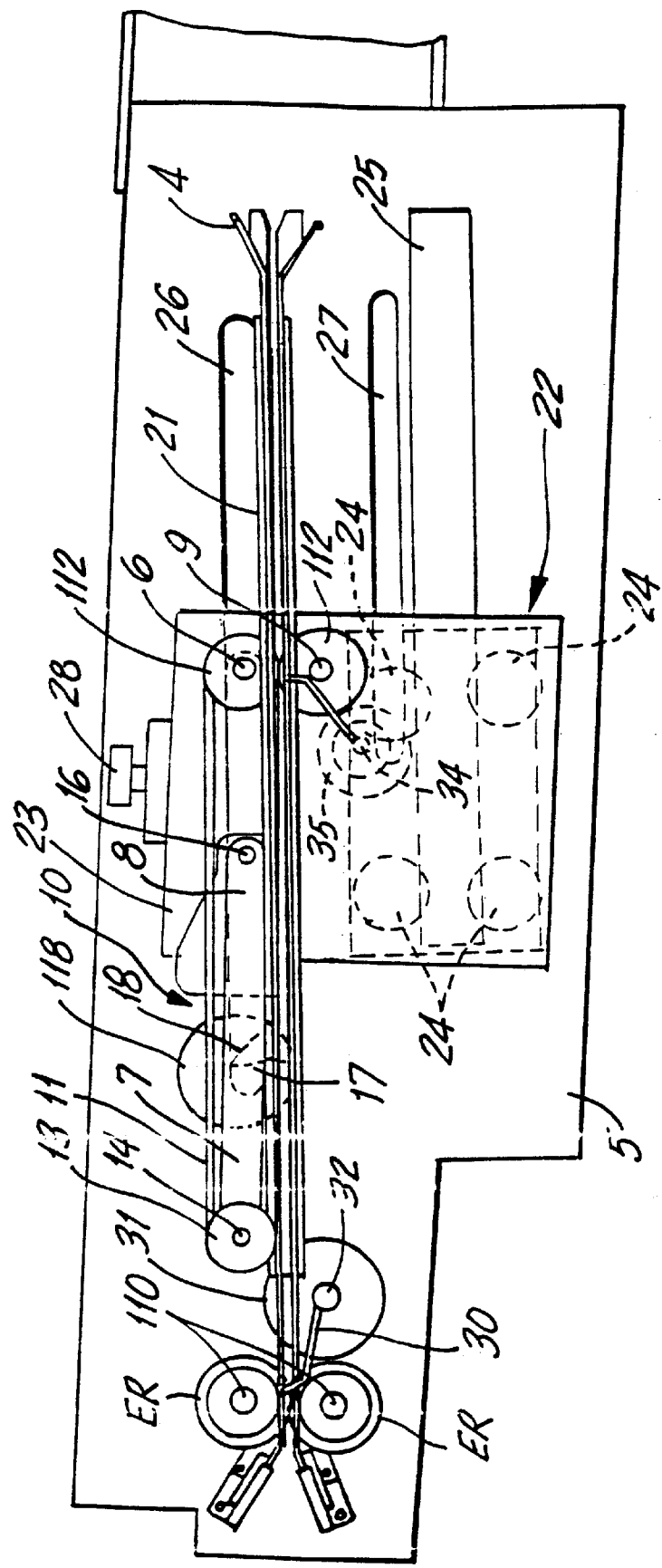
FIG. 5 is a schematic side elevational view showing the position of some parts when feeding sheets of the shortest length.
Figure 6:
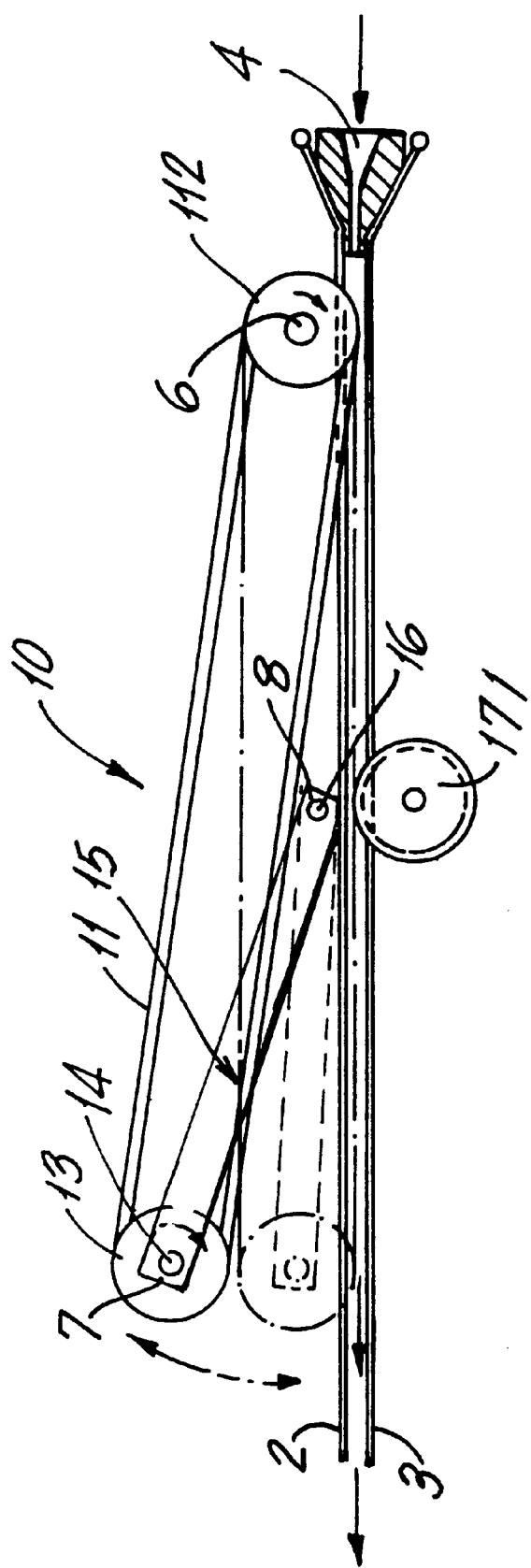
FIG. 6 is a schematic detailed side view showing the position of some of the parts to adjust the machine from feeding the longer sheets to feeding the shortest sheets.
Figure 7:
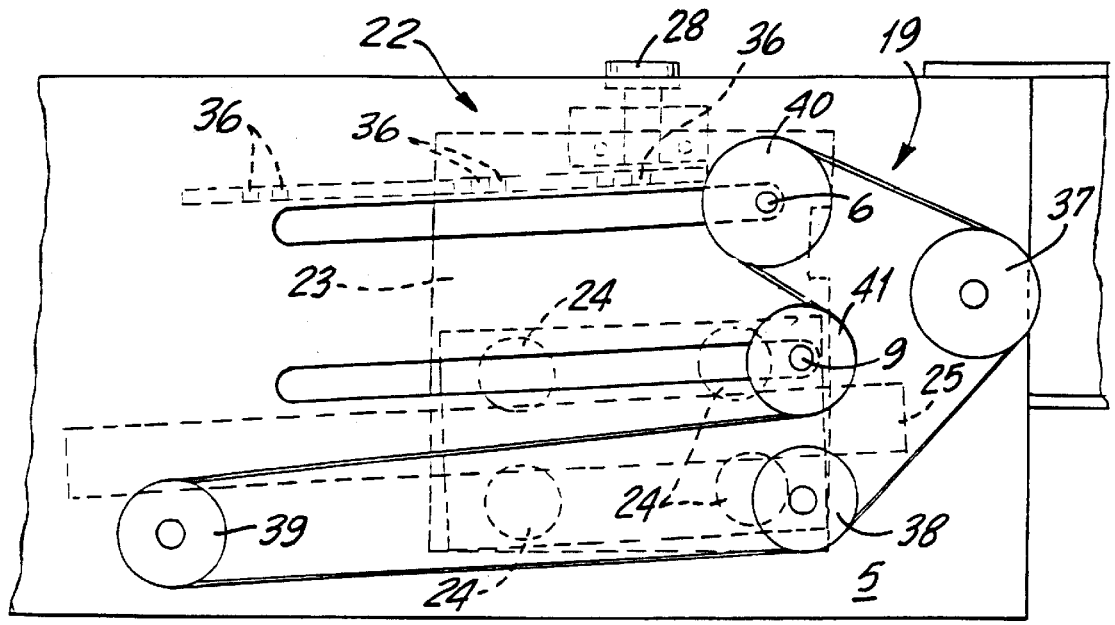
FIG. 7 is a side elevational view showing the positions of the drive system when feeding the longest sheets.

When sheets of intermediate size are to be processed, the trolley assembly 22 is moved to the intermediate position as shown in FIG. 4. The auxiliary conveyor assembly 10 remains in its raised position over the accumulating area. The feed rollers 12 and 112 as well as the main document kicker 20 is also moved to this intermediate position as part of the trolley assembly 22. The locking pegs 28 have been moved out of the rearmost lock openings 36 and have now been inserted into the intermediate lock openings 36 to hold the trolley assembly 22 in the intermediate position. The drive shafts 6 and 9 of the feed rollers 12 and 112 have also been moved forward along the slots 26–27. In this position, the accumulating area A is now shorter than it was when the longest sheets were being processed (FIG. 3). When sheets are fed by the insert rollers IR the sheets are held by the insert rollers IR until the leading edges L of the sheets S are grasped by the feed rollers 12 and 112 and are moved and deposited one by one into the now shortened accumulating area A in front of the main document kicker 20 and in back of the release gate 30. When a sufficient number of sheets are accumulated in the accumulating area A, the release gate 30 is lowered and the main document kicker 20 is swung forward in order to push the stack of sheets out of the accumulating area A through the exit rollers ER.

When the shortest sheets are to be processed, the sheets are too short for the input rollers IR and the main feed rollers 12 and 112 to continue to grasp the sheet S until the sheets are deposited into the accumulating area A. In order to process sheets of the shortest length, the trolley assembly 22 is now moved to its forward most position carrying with it the auxiliary conveyor assembly 10, the feed rollers 12 and 112 together with shafts 6 and 9 and the main document kicker 20 (which does not act on the shortest sheets). The lock pegs 28 from the immediate or rearmost lock openings 36, the trolley assembly 22 is moved down to its foremost position and the lock pegs 28 are inserted into the forward most openings 36. The belts 11 and front auxiliary feed rollers 13 of the auxiliary conveyor assembly 10 are lowered by moving arms 15 down around pivot shaft 16 so that the auxiliary feed rollers 13 are now in the path of the short sheets S being fed. When fed by insert rollers IR the leading edges of the sheets S are grasped by the feed rollers 12 and 112 and the sheets are held until the front auxiliary feed rollers 13 grasp the leading edge L of the sheets S. The sheets are controlled by the front auxiliary feed rollers 13 until they are deposited into the shortened accumulating area A in front of the auxiliary document pusher 17 and behind the front release gate 30. When the stack is complete and is to be moved forward, the auxiliary document kicker 17 will swing down and forward to push the stack forward while the release gate 30 will move out of the way to permit the sheets to be pushed through the exit rollers ER which will grasp the leading edge L of the stack of sheets and move them out of the machine.

When longer sheets are again to be processed by the machine, the entire auxiliary transfer conveyor assembly 10 is raised around pivot 16 and placed out of the way and the trolley assembly 22 is moved back to the desired intermediate or rearmost position. Hence, the machine can be easily and quickly be converted to feed either shorter sheets or longer sheets.

It will thus be seen that the present invention provides an improved sheet feeding mechanism which can be easily and quickly converted to feed sheets of shorter lengths, which can be converted to feed shorter or longer sheets with little or no down time, which is simple to operate and which is inexpensive to manufacture and to maintain.

As many and varied modifications of the subject matter of this invention will become apparent to those skilled in the art from the detailed description given herein above, it will be understood that the present invention is limited only as provided in the claims appended hereto.

The embodiments of the invention in which an exclusive property or privilege is claimed are defined as follows:

1. A sheet feeding mechanism comprising a frame support assembly, an accumulating area mounted on the said frame support assembly, said accumulating area comprising feeding means and release means, said feeding means adapted to feed sheets into said accumulating area to accumulate a stack of sheets, means for moving a stack of sheets out of said accumulating area past said release means, means for changing the size of said accumulating area to permit the accumulating area to receive sheets of different sizes, said size-varying means changes the length of the accumulating area to permit the accumulating area to receive sheets of different lengths, said feeding means being adapted to be moved toward said release means to change the length of said accumulating area, said release means is at one end of said accumulating area and said feeding means is spaced from said release means lengthwise of said accumulating area, a kicker assembly is provided substantially adjacent to said feeding means to push a stack of sheets out of the accumulating area, means are provided to activate the kicker assembly to move the stack out of the accumulating area and wherein means are provided to activate said release means to permit a stack to move out of the accumulating area, said feeding means comprise feed rollers, said feed rollers comprise main feed rollers, a main kicker assembly is provided adjacent to said main feed rollers, said main feed rollers and said main kicker assembly are adapted to move with said size-varying means, said size-varying means comprises a movable trolley assembly.

2. A sheet feeding mechanism as set forth in claim 1, wherein said trolley assembly comprises a pair of spaced support plates movably mounted on said frame support assembly.

3. A sheet feeding mechanism as set forth in claim 2, wherein means are provided for locking the trolley assembly in a predetermined position.

4. A sheet feeding mechanism as set forth in claim 3, wherein said trolley assembly is movable to various positions along said frame assembly to vary the length of the accumulating area.

5. A sheet feeding mechanism as set forth in claim 4, wherein an auxiliary conveyor assembly is provided which is adapted to process shorter length sheets.

6. A sheet feeding mechanism as set forth in claim 5, wherein said auxiliary conveyor assembly is moveable with said trolley assembly.

7. A sheet feeding mechanism as set forth in claim 6, wherein auxiliary rollers are mounted on said auxiliary conveyor for movement relative to the accumulating area.

8. A sheet feeding mechanism as set forth in claim 7 wherein said auxiliary rollers are mounted above said accumulating area for movement toward and away from said accumulating area.

9. A sheet feeding mechanism as set froth in claim 8, wherein said auxiliary rollers are mounted on arms which are pivotally mounted above the accumulating area.

10. A sheet feeding mechanism as set forth in claim 9, wherein means are provided to move short sheets into a shortened accumulating area.

11. A sheet feeding mechanism as set forth in claim 10, wherein an auxiliary kicker is mounted above the accumulating area to push a stack of sheets out of the accumulating area.

12. A sheet feeding mechanism, as set forth in claim 11, wherein said auxiliary rollers are adapted to be moved adjacent to the auxiliary kicker.

13. A sheet feeding mechanism as set forth in claim 12, wherein said auxiliary rollers are operatively associated with said main feed rollers through connecting drive belts.

14. A sheet feeding mechanism as set forth in claim 13, wherein the main feed rollers are rotated by drive shafts driven by main drive pulleys which move with said trolley assembly.

15. A sheet feeding mechanism as set forth in claim 14, wherein a power train is provided which comprises a power pulley, main drive pulleys and spaced stationary pulleys.

16. A sheet feeding mechanism as set forth in claim 15, wherein wheels extend from said support plates and said wheels move on rails on said frame support assembly.

17. A sheet feeding mechanism as set forth in claim 16, wherein slots are provided in said frame support assembly and wherein said drive shafts are moveable along said slots.

18. A sheet feeding mechanism as set forth in claim 17, wherein said locking means comprise lock pegs on the spaced frames support plates to enter the lock openings in the frame assembly in order to lock the trolley assembly in a predetermined position.

19. A sheet feeding mechanism as set forth in claim 18, wherein said accumulating area is comprised of a pair of spaced stationary cables between which the sheets accumulate.

20. A sheet feeding mechanism as set forth in claim 19, wherein an endless serpentine belt connects the main drive pulleys, the power pulleys and the stationary pulleys together.

* * * * *